United States Patent

Rudolph

[11] Patent Number: 6,115,082
[45] Date of Patent: Sep. 5, 2000

[54] COUPLER SYSTEMS FOR PROJECTION TELEVISIONS

[75] Inventor: John D. Rudolph, Cincinnati, Ohio

[73] Assignee: U.S. Precision Lens Inc., Cincinnati, Ohio

[21] Appl. No.: 09/142,336

[22] PCT Filed: Feb. 28, 1997

[86] PCT No.: PCT/US97/03129

§ 371 Date: Sep. 4, 1998

§ 102(e) Date: Sep. 4, 1998

[87] PCT Pub. No.: WO97/33432

PCT Pub. Date: Sep. 12, 1997

Related U.S. Application Data

[60] Provisional application No. 60/013,021, Mar. 8, 1996.
[51] Int. Cl.[7] .................. H04N 5/74; H04N 9/31
[52] U.S. Cl. .............. 348/749; 346/748; 346/776; 359/820
[58] Field of Search ................... 348/748, 749, 348/776, 778, 779, 781, 785, 805, 825, 826, 827; 313/36, 478, 477 R; 359/820; 353/84, 100, 101, 69; H04N 5/74, 9/31

[56] References Cited

U.S. PATENT DOCUMENTS 4,511,927  4/1985  Bauer ........................... 348/749
4,904,054  2/1990  Hiroshima ...................... 348/749

*Primary Examiner*—Michael H. Lee
*Attorney, Agent, or Firm*—Maurice M. Klee

[57] ABSTRACT

A coupler system (13) for mounting a projection lens (15) to a cathode ray tube (16) in a projection television (10) is provided. The system includes a first member (20) composed of a heat and chemical resistant plastic and a second member (22) composed of metal. The second member (22) is mounted to the periphery (18) of the faceplate (17) of the cathode ray tube (16) to provide a high level of heat transfer from the tube. The second member also absorbs x-rays emitted by the tube. The first member can be readily molded from high performance plastic resins and thus reduces the overall cost of the coupler system compared to couplers composed entirely of metal.

10 Claims, 5 Drawing Sheets

COUPLER SYSTEMS FOR PROJECTION TELEVISIONS

CROSS REFERENCE TO RELATED PROVISIONAL APPLICATION

This application claims the benefit under 35 USC §119(e) of U.S. Provisional Application No. 60/013,021, filed Mar. 8, 1996, the contents of which are incorporated herein in their entirety.

FIELD OF THE INVENTION

This invention relates to projection televisions and, in particular, to improved coupler systems for mounting projection lenses to the cathode ray tubes (CRTs) of such televisions.

BACKGROUND OF THE INVENTION

Modern consumer rear-screen projection televisions utilize liquid coupling of the projection optics to the CRT faceplates to enhance contrast and to avoid localized hot spots on the CRT which may result in CRT failure. The coupling is accomplished by way of a metal coupler (either die cast or stamped) which has a special coating to provide a surface durable enough to withstand the corrosive nature of the coupling fluid, e.g., a mixture of ethylene glycol and glycerine.

The metal coupler is a significant cost component in the overall television set. An example of such a prior art coupler, composed of die-cast aluminum and comprising multiple cooling fins and an integral expansion chamber, is shown in FIG. 2 of Hanyu et al., U.S. Pat. No. 5,010,396.

In the past, attempts have been made to cost-reduce the system by molding the coupler from plastic resins and protecting the coupler body from the coupling fluid by adding a rubber bladder inside the coupler housing. This system has not been commercially successful. Possible reasons for this include cost of the bladder, reliability/life of the bladder, poor thermal conductivity through the bladder/housing, thermal degradation of the bladder and/or coupler, and lack of x-ray absorption (another function of the metal couplers).

The present invention is directed at solving these problems associated with the use of plastic materials in couplers.

SUMMARY OF THE INVENTION

In view of the foregoing, it is an object of this invention to provide a commercially usable coupler which comprises a plastic material. More particularly, it is an object of the invention to provide a coupler which is primarily composed of plastic and yet achieves high levels of both x-ray absorption and dissipation of the heat generated by a CRT.

To achieve the foregoing and other objects, the invention provides an improved coupler system for use with a cathode ray tube whose faceplate is cooled by a coupler fluid, the system comprising:

(a) a first member for mounting to the faceplate of the cathode ray tube in a fluid tight relationship, said first member
 (i) defining a fluid receiving space (reservoir) for receiving the coupler fluid; and
 (ii) being composed of a plastic material which is resistant to heat and to exposure to the coupler fluid;
(b) a second member for mounting to the periphery of the faceplate in a heat transferring relationship, said second member being composed of a metallic material capable of absorbing x-rays; and
(c) means for mounting a projection lens or a component thereof to the first member in a fluid tight relationship so as to seal the fluid receiving space of the first member.

In certain preferred embodiments of the invention, the first and second members are arranged so that the second member does not come into direct contact with the coupler fluid. A preferred form for the second member is that of a hollow shell which fits around the outside (periphery) of the CRT's faceplate and defines a cavity which receives the first member.

For some applications, the second member may not be required for heat and x-ray control and thus may be omitted from the coupler system.

Figure 1:
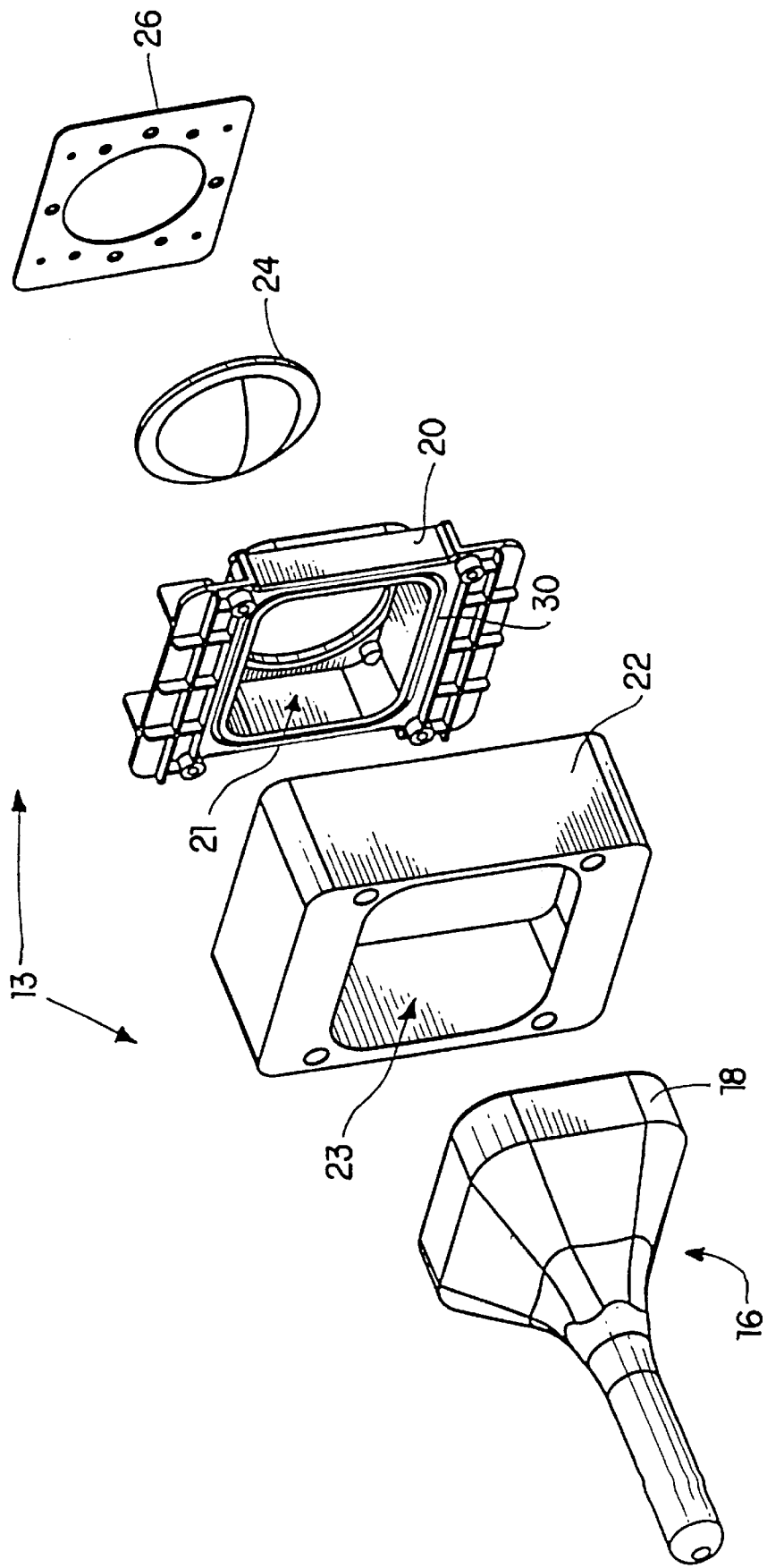
FIG. 1 is an exploded, perspective view of a coupler system constructed in accordance with the invention.

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

The reference numbers used in the drawings correspond to the following:

10 projection television
12 projection television cabinet
13 coupler system
14 projection screen
15 projection lens
16 cathode ray tube (CRT)
17 faceplate of CRT
18 periphery of faceplate of CRT
19 mirror
20 first member of coupler (plastic)
21 space defined by first member for coupler fluid (reservoir)
22 second member of coupler (metal)
23 cavity defined by second member for receiving first member
24 lens element
26 clamp plate
28 focus mount
30 gasket cavity
32 gasket cavity
34 slots in focus mount

DESCRIPTION OF THE PREFERRED EMBODIMENTS

With reference to the drawings, where like reference numbers designate like or corresponding parts throughout the several views, FIG. 1 shows an exploded view of a coupler system 13 constructed in accordance with the invention. The system includes first member 20 which is composed of a plastic material, second member 22 which is composed of metal, and clamp plate 26 for mounting lens element 24 to first member 20.

Figure 2:
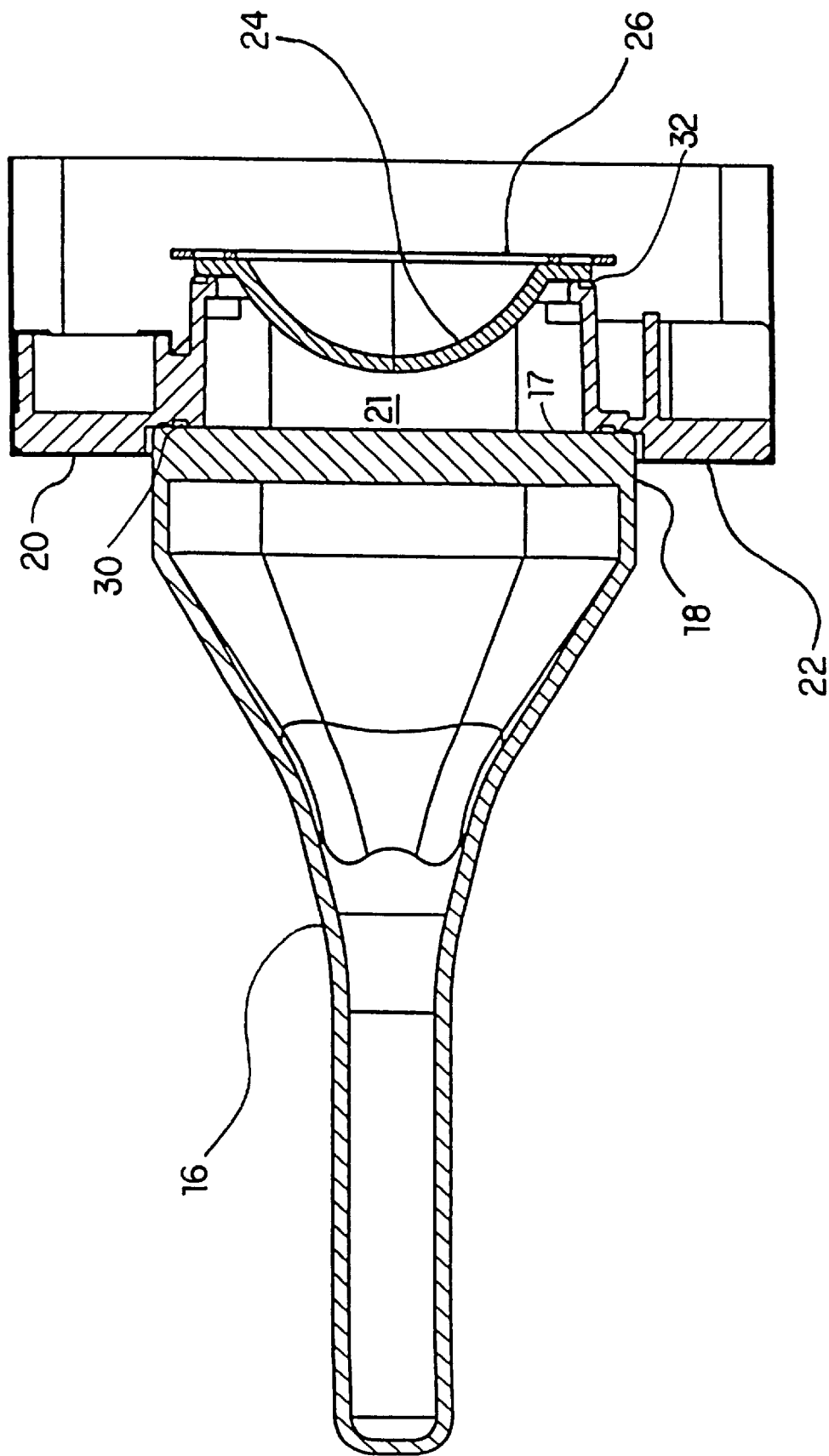
FIG. 2 is a cross-sectional view of the coupler system of FIG. 1 in its assembled state.

As shown in FIG. 2, the coupler system is mounted to faceplate 17 of CRT 16 with first member 20 in direct contact with the faceplate and with second member 22 in contact with the periphery 18 of the faceplate. First member 20 includes a first cavity 30 for receiving a gasket, e.g., an O-ring (not shown), for forming a fluid tight seal between the first member and the faceplate. Similarly, first member 20 includes a second cavity 32 for receiving a second gasket, e.g., a second O-ring (not shown), for forming a fluid tight seal with plastic lens element 24 when that element is mounted to the first member by clamp plate 26. Conventional fastening hardware (not shown) is used to mount the CRT, the first member, the second member, and the clamp plate to one another.

As can be seen most clearly in FIG. 1, first member 20 defines a space or reservoir 21 for receiving coupling fluid, which space becomes fluid tight when the various components of the coupler system are assembled together with the CRT. Similarly, second member 22 defines a cavity 23 for receiving the first member. In this way, the second member surrounds the first member and projects forward from the CRT so as to provide enhanced heat dissipation and x-ray absorption.

As shown in FIG. 2, second member 22 engages the periphery 18 of CRT faceplate 17. In terms of heat dissipation, this arrangement is considered optimum since during steady state operation, the maximum temperature of the CRT's glass envelope occurs in this area.

Figure 3:
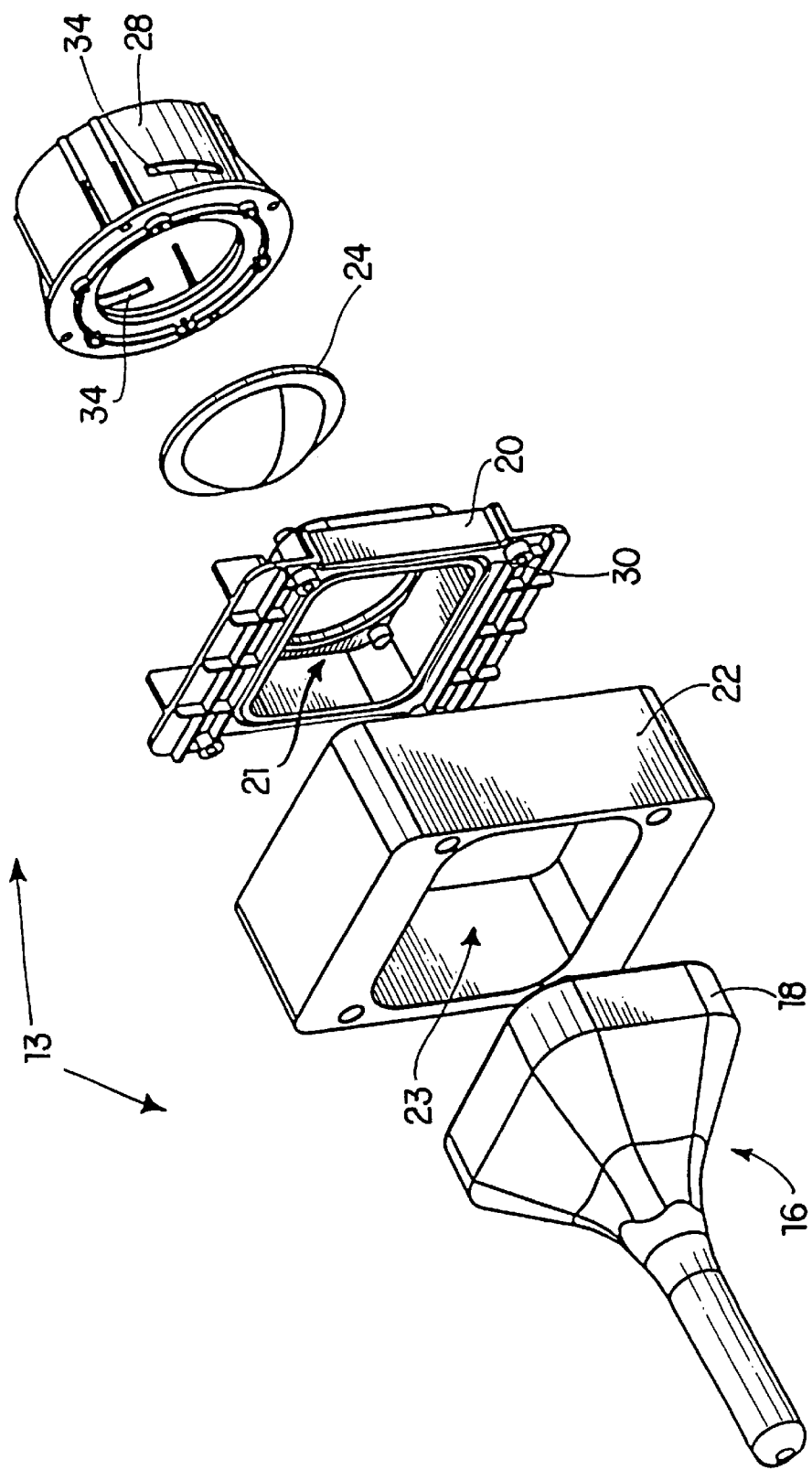
FIG. 3 is an exploded, perspective view of an alternate embodiment of the coupler system of FIG. 1.
Figure 4:
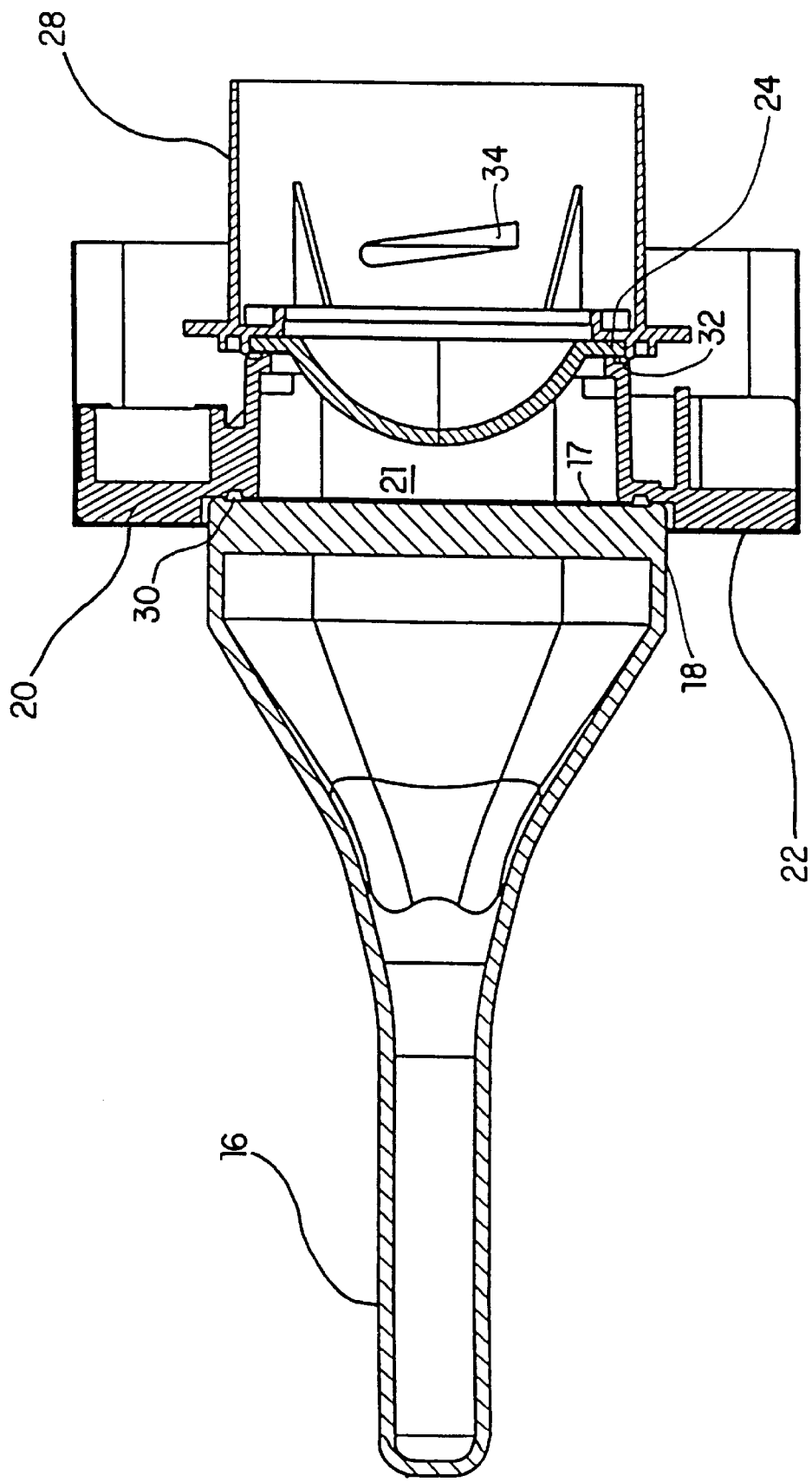
FIG. 4 is a cross-sectional view of the coupler system of FIG. 3 in its assembled state.

FIGS. 3 and 4 show an alternate embodiment of the coupler system where clamp plate 26 has been replaced with focus mount 28. The focus mount holds plastic lens element 24 in place and during use is connected to a lens barrel (not shown) which carries other lens elements of the projection lens. Slots 34 formed in the wall of the focus mount allow for axial positioning of the lens barrel to adjust the overall focus of the projection lens system, such focus being a function of the lens elements carried by the lens barrel, lens element 24, the coupling fluid in space 21, and the faceplate, which in some embodiments may be curved. As with clamp plate 26, conventional fastening hardware (not shown) is used to mount the focus mount to other elements of the coupler system.

Figure 5:
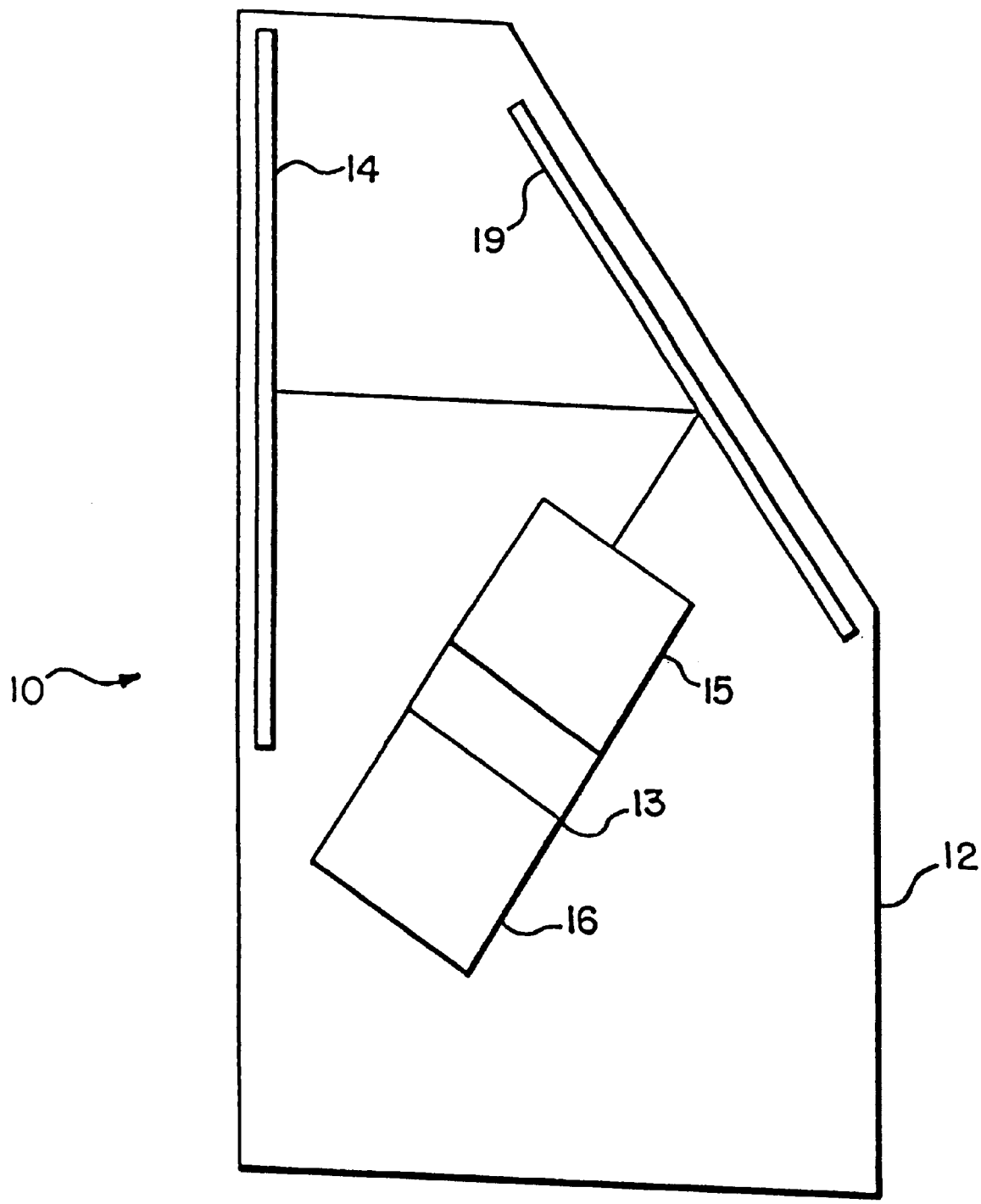
FIG. 5 is a schematic diagram of a projection television employing the coupler system of the invention.

FIG. 5 is a schematic diagram of a rear projection television 10 employing the improved coupler system of the present invention. As shown in this figure, projection television 10 includes cabinet 12 having projection screen 14 along its front face and slanted mirror 19 along its back face. Module 13 in FIG. 5 schematically illustrates a coupling system constructed in accordance with the invention which couples module 15 representing a projection lens to module 16 representing a CRT tube. In practice, three couplers 13, three projection lenses 15 and three CRT tubes 16 are used to project red, green, and blue images onto screen 14.

Although the invention has been described in terms of a rear projection television, the coupler systems disclosed herein can also be used with front projection televisions. Front projection television sets do not include a mirror 19 or a screen 14 as part of cabinet 12, but otherwise operate in the same basic manner as a rear projection television set.

The success of the coupling system of the present invention depends upon the materials used for the first and second members, in particular, the first member. That member is preferably formed by molding a plastic resin which possesses the basic mechanical, thermal, and chemical durability properties needed for coupling.

Examples of materials which meet these requirements include glass-reinforced nylons, e.g., fiber-reinforced nylon 6/6 sold under the trademark ZYTEL by du Pont Engineering Polymers (Wilmington, Del.; Product No. FE-5105), and NORYL GTX 830, a nylon copolymer, manufactured by General Electric Plastics (Pittsfield, Mass.). The fiber reinforcement used in these products provides them with sufficient heat resistance to withstand the temperatures typically encountered in the vicinity of a CRT faceplate, as well as added strength to withstand the forces associated with the system.

Even higher levels of heat resistance can be achieved through the use of a polyphthalamide resin such as that sold under the AMODEL trademark by Amoco Performance Products Incorporated (Alpharetta, Georgia; catalog number AS-1133 HS). Again, this material is preferably fiber-reinforced.

Other resins having the requisite thermal and mechanical properties can be used as desired. In general, the thermal and mechanical properties of any particular resin can be tailored by varying the type and amount of glass or other type of reinforcement material used. Examples of other materials which can be used for reinforcement include glass beads and mineral fillers. Mixtures of materials can also be used.

In general terms, the reinforcement material will be non-elastic and will impart structural strength (rigidity) to the first member so that it will maintain a firm seal with the CRT and the projection lens over the life of the system. The reinforcement material also allows the first member to have relatively thin walls which aids in heat dissipation. In addition to reinforcement materials, the resins used for the first member will also generally include a dye or filler which imparts a dark color, e.g., a black color, to the member so that the member does not reflect substantial amounts of light from the CRT into the projection lens.

The second member can be composed of various metals, such as, steel, zinc, nickel, etc. More than one metal can be used if desired in, for example, a sandwich or layered configuration. In general, the member should have a thickness sufficient to provide a substantial level of shielding of the x-rays emitted by the CRT, e.g., a thickness of about one millimeter in the case of steel. The second member is preferably formed by stamping, but can also be cast if desired. This member can have a variety of configurations other than that shown in FIGS. 1–4, e.g., it can include fins or other structures to improve its heat dissipation.

The improved couplers of the invention exhibit numerous benefits in comparison with the all-metal couplers now in use. Among those benefits are lower cost, ease of assembly, and material recycle capability. Furthermore, because of the direct molding characteristics, the mechanical features needed for attaching the projection lens and the CRT can be molded into the first member along with mounting provisions for such functional components as a liquid expansion chamber. Cooling fins, as appropriate, can also be added.

The embodiment of the invention shown in FIGS. 3 and 4 is especially advantageous since the projection lens barrel can be mounted directly to the coupler while simultaneously affixing lens element 24. This simplifies the assembly process as well as eliminates the need for a separate clamp plate and other associated hardware items for the lens barrel.

Although preferred and other embodiments of the invention have been described herein, further embodiments may be perceived by those skilled in the art without departing from the scope of the invention as defined by the following claims.

What is claimed is:

1. A coupler system for coupling a projection lens to a cathode ray tube, wherein the cathode ray tube has a faceplate which is cooled by a coupler fluid which comprises a mixture of ethylene glycol and glycerin, said system comprising:
   (a) a first member for mounting to the faceplate of the cathode ray tube in a fluid tight relationship, said first member
       (i) defining a fluid receiving space for receiving the coupler fluid; and
       (ii) being composed of a plastic material which is resistant to heat and to exposure to said coupler fluid comprising a mixture of ethylene glycol and glycerin;
   (b) means for mounting a projection lens or a component thereof to the first member in a fluid tight relationship so as to seal the fluid receiving space of the first member;and
   (c) a second member for mounting to the faceplate in a heat transferring relationship, said second member being composed of a metallic material;
   wherein the first member comes into contact with the coupler fluid and the second member does not come into contact with the coupler fluid during use of the coupler system.

2. The coupler system of claim 1 wherein the first member is produced by molding.

3. The coupler system of claim 1 wherein the first member is composed of a reinforced plastic resin.

4. The coupler system of claim 3 wherein the plastic resin is reinforced with glass fibers.

5. The coupler system of claim 1 wherein the second member is mounted to the periphery of the faceplate.

6. The coupler system of claim 1 wherein the second member is capable of absorbing x-rays produced by the cathode ray tube.

7. The coupler system of claim 1 wherein the second member defines a cavity for receiving the first member.

8. The coupler system of claim 1 wherein the means for mounting comprises means for adjusting the focus of the projection lens.

9. A projection television set comprising a cathode ray tube, a projection lens, and a coupler system for coupling the projection lens to the cathode ray tube, said coupler system comprising the coupler system of claim 1, 6, or 10.

10. A projection television set comprising three cathode ray tubes, three projection lenses, and three coupler systems, each coupler system coupling one of the projection lenses to one of the cathode ray tubes and comprising the coupler system of claim 1, 6, or 10.

* * * * *